(12) United States Patent
Raichelgauz et al.

(10) Patent No.: US 11,704,292 B2
(45) Date of Patent: Jul. 18, 2023

(54) SYSTEM AND METHOD FOR ENRICHING A CONCEPT DATABASE

(71) Applicant: Cortica Ltd., Tel Aviv (IL)

(72) Inventors: Igal Raichelgauz, Tel Aviv (IL); Adam Harel, Tel Aviv (IL); Karina Odinaev, Tel Aviv (IL); Yehoshua Y Zeevi, Haifa (IL)

(73) Assignee: Cortica Ltd., Tel Aviv (IL)

( * ) Notice: Subject to any disclaimer, the term of this patent is extended or adjusted under 35 U.S.C. 154(b) by 0 days.

(21) Appl. No.: 16/583,790

(22) Filed: Sep. 26, 2019

(65) Prior Publication Data

US 2021/0097040 A1  Apr. 1, 2021

(51) Int. Cl.
*G06F 16/215* (2019.01)
*G06F 16/41* (2019.01)
*G06F 16/483* (2019.01)

(52) U.S. Cl.
CPC ............ *G06F 16/215* (2019.01); *G06F 16/41* (2019.01); *G06F 16/483* (2019.01)

(58) Field of Classification Search
CPC ...... G06F 16/215; G06F 16/483; G06F 16/41; G06F 16/45
See application file for complete search history.

(56) References Cited

U.S. PATENT DOCUMENTS

| | | |
|---|---|---|
| 6,640,015 B1 | 10/2003 | Lafruit |
| 7,801,893 B2 | 9/2010 | Gulli |
| 7,860,895 B1 | 12/2010 | Scofield |
| 8,098,934 B2 | 1/2012 | Vincent |
| 8,275,764 B2 | 9/2012 | Jeon |
| RE44,225 E | 5/2013 | Aviv |
| 8,527,978 B1 | 9/2013 | Sallam |
| 8,634,980 B1 | 1/2014 | Urmson |
| 8,781,152 B2 | 7/2014 | Momeyer |

(Continued)

OTHER PUBLICATIONS

Jasinschi et al., a Probabilistic Layered Framework for Integrating Multimedia Content and Context Information, 2002, IEEE, p. 2057-2060. (Year: 2002).

(Continued)

*Primary Examiner* — Ashish Thomas
*Assistant Examiner* — Yohanes D Kelemework
(74) *Attorney, Agent, or Firm* — Reches Patents

(57) ABSTRACT

A system and method for enriching a concept database. The method includes determining, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE; generating a reduced representation of the first MMDE, wherein generating the reduced representation further comprises removing the portion of the first MMDE matching the at least one first concept; comparing the reduced representation of the first MMDE to signatures representing a plurality of second MMDEs to determine a plurality of matching second MMDEs; generating, based on the reduced representation of the first MMDE and the plurality of matching second MMDEs, at least one second concept; and adding the generated at least one second concept to the concept database.

20 Claims, 5 Drawing Sheets

(56) References Cited

U.S. PATENT DOCUMENTS

| | | |
|---|---|---|
| 8,782,077 B1 | 7/2014 | Rowley |
| 9,298,763 B1 | 3/2016 | Zack |
| 9,440,647 B1 | 9/2016 | Sucan |
| 9,734,533 B1 | 8/2017 | Givot |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2002/0019882 A1 | 2/2002 | Bokhani |
| 2002/0163532 A1 | 11/2002 | Thomas |
| 2003/0037010 A1 | 2/2003 | Schmelzer |
| 2004/0059736 A1 | 3/2004 | Willse |
| 2004/0091111 A1 | 5/2004 | Levy |
| 2004/0230572 A1 | 11/2004 | Omoigui |
| 2005/0193015 A1 | 9/2005 | Logston |
| 2006/0100987 A1 | 5/2006 | Leurs |
| 2006/0120626 A1 | 6/2006 | Perlmutter |
| 2006/0248558 A1 | 11/2006 | Barton |
| 2006/0251339 A1 | 11/2006 | Gokturk |
| 2007/0196013 A1 | 8/2007 | Li |
| 2008/0109433 A1 | 5/2008 | Rose |
| 2008/0152231 A1 | 6/2008 | Gokturk |
| 2008/0165861 A1 | 7/2008 | Wen |
| 2008/0166020 A1 | 7/2008 | Kosaka |
| 2008/0253737 A1 | 10/2008 | Kimura |
| 2008/0270569 A1 | 10/2008 | McBride |
| 2008/0294278 A1 | 11/2008 | Borgeson et al. |
| 2009/0022472 A1 | 1/2009 | Bronstein |
| 2009/0034791 A1 | 2/2009 | Doretto |
| 2009/0043818 A1 | 2/2009 | Raichelgauz |
| 2009/0080759 A1 | 3/2009 | Bhaskar |
| 2009/0216761 A1 | 8/2009 | Raichelgauz |
| 2009/0278934 A1 | 11/2009 | Ecker |
| 2010/0042646 A1 | 2/2010 | Raichelqauz |
| 2010/0082684 A1 | 4/2010 | Churchill |
| 2010/0104184 A1 | 4/2010 | Bronstein |
| 2010/0111408 A1 | 5/2010 | Matsuhira |
| 2010/0125569 A1 | 5/2010 | Nair |
| 2010/0162405 A1 | 6/2010 | Cook |
| 2010/0306193 A1 | 12/2010 | Pereira |
| 2011/0029620 A1 | 2/2011 | Bonforte |
| 2011/0038545 A1 | 2/2011 | Bober |
| 2011/0055585 A1 | 3/2011 | Lee |
| 2011/0085734 A1* | 4/2011 | Berg .................. G06F 16/785 382/195 |
| 2011/0208744 A1 | 8/2011 | Chandiramani |
| 2011/0246566 A1 | 10/2011 | Kashef |
| 2012/0133497 A1 | 5/2012 | Sasaki |
| 2012/0167133 A1 | 6/2012 | Carroll |
| 2012/0179751 A1 | 7/2012 | Ahn |
| 2012/0197857 A1 | 8/2012 | Huang |
| 2012/0215789 A1* | 8/2012 | Ramanathan ....... G06F 16/7847 707/747 |
| 2013/0103814 A1 | 4/2013 | Carrasco |
| 2013/0212493 A1 | 8/2013 | Krishnamurthy |
| 2013/0226820 A1 | 8/2013 | Sedota, Jr. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0201330 A1 | 7/2014 | Lozano Lopez |
| 2014/0379477 A1 | 12/2014 | Sheinfeld |
| 2015/0033150 A1 | 1/2015 | Lee |
| 2015/0117784 A1 | 4/2015 | Lin |
| 2015/0134688 A1 | 5/2015 | Jing |
| 2015/0363644 A1 | 12/2015 | Wnuk |
| 2016/0210525 A1 | 7/2016 | Yang |
| 2016/0221592 A1 | 8/2016 | Puttagunta |
| 2016/0283483 A1 | 9/2016 | Jiang |
| 2016/0342683 A1 | 11/2016 | Kwon |
| 2016/0357188 A1 | 12/2016 | Ansari |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

OTHER PUBLICATIONS

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "Clue: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

SYSTEM AND METHOD FOR ENRICHING A CONCEPT DATABASE

CROSS-REFERENCE TO RELATED APPLICATIONS

This application claims the benefit of U.S. Provisional Application No. 62/403,144 filed on Oct. 2, 2016. This application is also a continuation-in-part of U.S. patent application Ser. No. 15/296,551 filed on Oct. 18, 2016, which claims the benefit of U.S. Provisional Patent Application No. 62/310,742 filed on Mar. 20, 2016. The Ser. No. 15/296,551 Application is also a continuation-in-part of U.S. patent application Ser. No. 14/643,694 filed on Mar. 10, 2015, now U.S. Pat. No. 9,672,217, which is a continuation of U.S. patent application Ser. No. 13/766,463 filed on Feb. 13, 2013, now U.S. Pat. No. 9,031,999. The Ser. No. 13/766,463 Application is a continuation-in-part of U.S. patent application Ser. No. 13/602,858 filed on Sep. 4, 2012, now U.S. Pat. No. 8,868,619. The Ser. No. 13/602,858 Application is a continuation of U.S. patent application Ser. No. 12/603,123 filed on Oct. 21, 2009, now U.S. Pat. No. 8,266,185. The Ser. No. 12/603,123 Application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888 filed on Jan. 5, 2009, which is a continuation-in-part of the above-referenced U.S. patent application Ser. Nos. 12/084,150 and 12/195,863; and (4) U.S. patent application Ser. No. 12/538,495 filed on Aug. 10, 2009, now U.S. Pat. No. 8,312,031, which is a continuation-in-part of the above-referenced U.S. patent application Ser. Nos. 12/084,150; 12/195,863; and 12/348,888.

All of the applications referenced above are herein incorporated by reference.

TECHNICAL FIELD

The present disclosure relates generally to content management, and more particularly to the enrichment of a concept database for the purpose of effective storage, management, knowledge database generation and search.

BACKGROUND

As the amount of content available over the Internet continues to grow exponentially in size, the task of finding relevant content has become increasingly cumbersome. Further, such content may not always be sufficiently organized or identified, thereby resulting in missed content.

With the abundance of multimedia data made available through various means in general and the Internet and world-wide web (WWW) in particular, there is a need for effective ways of searching for, and management of, such multimedia data. Searching, organizing and management of multimedia data can be challenging at best due to the difficulty involved in representing and comparing the information embedded within the content, and due to the scale of information to be checked.

Moreover, when it is necessary to find a content of video by means of a textual query, some existing solutions revert to various metadata that textually describe the content of the multimedia data. However, such content may be abstract and complex by nature and not adequately defined by the existing and/or attached metadata.

The rapidly increasing multimedia databases, accessible for example through the Internet, calls for the application of new methods of representation of information embedded in the content. Searching for multimedia is challenging due to the large amount of information that has to be priority indexed, classified and clustered. Moreover, prior art techniques revert to model-based methods to define and/or describe multimedia data.

However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of images or video clips or segments. In some cases, the model of the car would be part of the metadata, but in many cases, it would not. Moreover, the image of the car may be at angles different from the angles of a specific photograph of the car that is available as a reference search item. Similarly, if a piece of music, as in a sequence of notes, is to be found, it is not necessarily the case that in all available content the notes are known in their metadata form, or for that matter, the search pattern may just be a brief audio clip.

Searching multimedia content has been a challenge for a number of years and has therefore received considerable attention. Early systems would take a multimedia data element in the form of, for example, an image, compute various visual features from it and then search one or more indexes to return images with similar features. In addition, values for these features and appropriate weights reflecting their relative importance could be also used. These methods have improved over time to handle various types of multimedia inputs and to handle them in an ever-increasing effectiveness. However, because of the exponential growth of the use of the Internet, the multimedia data available from these prior art systems have become less effective in handling the currently available multimedia data due to the vast amounts already existing as well as the speed at which new data is added.

Searching through multimedia data has therefore become a significant challenge, where even the addition of metadata to assist in the search has limited functionality. First, metadata may be inaccurate or not fully descriptive of the multimedia data, and second, not every piece of multimedia data can be described accurately enough by a sequence of textual metadata. A query model for a search engine has some advantages, such as comparison and ranking of images based on objective visual features, rather than on subjective image annotations. However, the query model has its drawbacks as well. When no metadata is available and only the multimedia data needs to be used, the process requires significant effort. Those skilled in the art will appreciate that there is no known intuitive way of describing multimedia data.

Therefore, a large gap may be found between a user's perception or conceptual understanding of the multimedia data and the way it is actually stored and manipulated by a search engine. The current generation of web applications is effective at aggregating massive amounts of data of different multimedia content, such as, pictures, videos, clips, paintings and mash-ups, capable of slicing and dicing it in different ways, as well as searching it and displaying it in an organized fashion, by using, for example, concept networks.

A concept may enable understanding of a multimedia data from its related concept.

However, current art is unable to add any real "intelligence" to the mix, i.e. no new knowledge is extracted from the multimedia data they aggregated by these systems. Moreover, the systems tend to be non-scalable due to the vast amounts of data they must handle, as many are configured to analyze and reanalyze entire multimedia data elements to identify various part contained therein. This hinders the ability to provide high quality searching for multimedia content.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for enriching a concept database, the method including: determining, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE; generating a reduced representation of the first MMDE, wherein generating the reduced representation further comprises removing the portion of the first MMDE matching the at least one first concept; comparing the reduced representation of the first MMDE to signatures representing a plurality of second MMDEs to determine a plurality of matching second MMDEs; generating, based on the reduced representation of the first MMDE and the plurality of matching second MMDEs, at least one second concept; and adding the generated at least one second concept to the concept database.

Certain embodiments disclosed herein also include a non-transitory computer readable medium having stored thereon instructions for causing a processing circuitry to perform a process, the process including: determining, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE; generating a reduced representation of the first MMDE, wherein generating the reduced representation further comprises removing the portion of the first MMDE matching the at least one first concept; comparing the reduced representation of the first MMDE to signatures representing a plurality of second MMDEs to determine a plurality of matching second MMDEs; generating, based on the reduced representation of the first MMDE and the plurality of matching second MMDEs, at least one second concept; and adding the generated at least one second concept to the concept database.

Certain embodiments disclosed herein also include a system for enriching a concept database, including: a processing circuitry; and a memory, the memory containing instructions that, when executed by the processing circuitry, configure the system to: determine, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE; generate a reduced representation of the first MMDE, wherein generating the reduced representation further comprises removing the portion of the first MMDE matching the at least one first concept; comparing the reduced representation of the first MMDE to signatures representing a plurality of second MMDEs to determine a plurality of matching second MMDEs; generate, based on the reduced representation of the first MMDE and the plurality of matching second MMDEs, at least one second concept; and add the generated at least one second concept to the concept database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
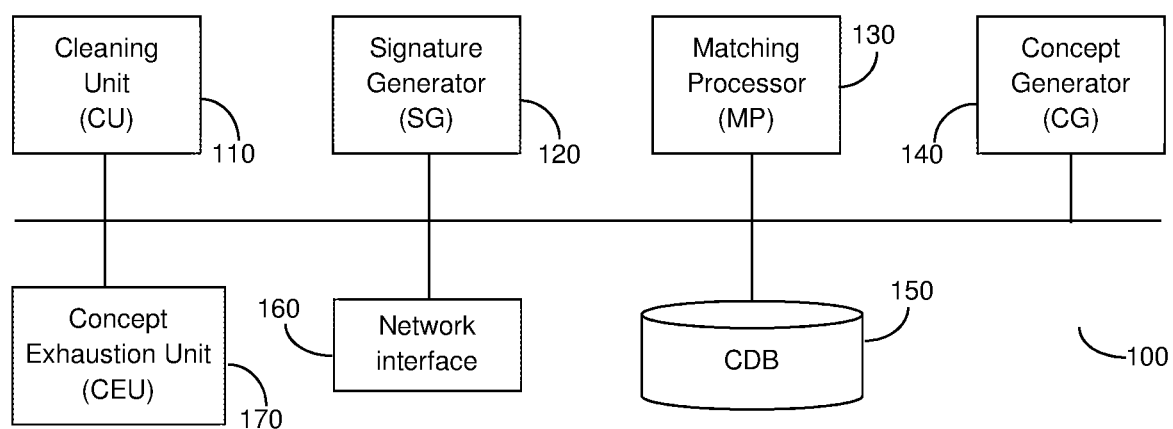
FIG. 1 is a block diagram of a system for enriching a concept database according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for enriching a content database, including a large-scale web-platform for multimedia deep-content-classification (DCC), capable of continuously enriching a concept database. The concept database includes concepts which provide condensed representations of multimedia content. For example, various images and videos of cats may be represented by signatures generated for portions of multimedia content elements showing features of cats and metadata including the word "cats." Thus, a concept database, as described herein, allows for reduced utilization of memory as compared to, for example, storing full representations of individual multimedia content elements.

The disclosed embodiments allow for enriching such a concept database. The enriched concept database provides representation of a larger number of concepts than an unenriched concept database, and provides for such enrichment more efficiently than manual enrichment (e.g., by manually selecting concepts to be added). Further, the enrichment provides for improved processing and memory utilization by excluding redundant concepts that are already present in the concept database from being used for enrichment.

FIG. 1 shows a block diagram of a system 100 for enriching a concept database according to an embodiment. The system 100 is configured to receive multimedia data elements (MMDEs), for example from the Internet, via a network interface 160. The MMDEs may include, but are not limited to, images, graphics, video streams, video clips, video frames, photographs, images of signals, combinations thereof, and portions thereof. The images of signals may be images such as, but not limited to, medical signals, geophysical signals, subsonic signals, supersonic signals, electromagnetic signals, infrared signals, and portions thereof.

Each MMDE received is analyzed by a signature generator (SG) 120 to generate at least one signature thereto. The operation of the signature generator is described in more detail herein below with respect of FIGS. 3 and 4. Each signature represents a concept structure (hereinafter referred to as a "concept," merely for simplicity purposes), and may be robust to noise and distortion. Based on the at least one signature, the MMDE is matched to a concept database (CDB) 150 by a matching processor (MP) 130. The CDB 150 stores therein a plurality of concepts. Each concept is a collection of signatures representing multimedia data elements and metadata describing the concept, and acts as an abstract description of the content to which the signature was generated. As a non-limiting example, a 'Superman concept' is a signature-reduced cluster of signatures representing elements (such as MMDEs) related to, e.g., a Superman cartoon: and a set of metadata including a textual representation of the Superman concept. As another example, metadata of a concept represented by the signature generated for a picture showing a bouquet of red roses is "flowers." As yet another example, metadata of a concept represented by the signature generated for a picture showing a bouquet of wilted roses is "wilted flowers".

It should be noted that using signatures for generating reduced representations of content shown in MMDEs ensures more accurate identification of concepts featured therein than, for example, based on metadata alone. Specifically, the signatures, as described herein, allow for recognition and classification of multimedia content elements.

Concepts are numeric sequences representative of a certain collection of signatures. The concepts are generated by a process of inter-matching of the signatures once it determines that there is a number of elements therein above a predefined threshold. That threshold needs to be large enough to enable proper and meaningful clustering. Subsequently to the match of the MMDE to the CDB 150 by the MP 130, a process of clustering reduction takes place so as to extract the most useful data from the cluster while keeping it at an optimal size to produce meaningful results.

The clustering reduction may be performed recursively, for example, after each time a matching concept is found. The clustering reduction allows for increased efficiency and reduced utilization of computing resources while searching for matching concepts. It should be noted that the clustering reduction may limit the scope of potential matches and, therefore, is optional. Further, whether to perform the clustering reduction may be determined based on the degree of matching, the matching concepts, or both. When new signatures are provided after the initial phase, the new signatures may be immediately checked against the reduced clusters, i.e., the concepts structures.

In addition to the cluster reduction, a MMDE cleaning process may be applied to the received MMDE. The cleaning process is performed by a cleaning unit (CU) 110 and involves the removal of redundant elements from the at least one MMDE based on the match. The redundant elements are elements for which concept structures already exist in the CDB 150.

The cleaned representation of the MMDE is then matched using the signature(s) to a plurality of MMDEs over the web via the network interface 160. According to an embodiment, the match may be to one or more databases coupled to the system 100 either directly or via the network. The MMDEs may be tagged, i.e., their content is known, or untagged.

According to another embodiment, a routing process takes place where the MP 130 queries the CDB 150 for concepts that match the MMDE and a reduced representation of the MMDE is generated. To this end, the routing process may include removing portions of the generated signature that match concept structures in the CDB 150, removing portions of the MMDE represented by such matching signature portions, or both. When portions of the MMDE are removed, a reduced representation including signatures representing the remaining portions of the MMDE may be generated. Such a routing process enables reduction of the matching process with the plurality of MMDEs.

As a non-limiting example, if an image of a German Sheppard is received, the first matching concept may be 'dogs'. Upon cleaning of the portion of the image represented by the 'dogs' concept, only characteristics associated with the German Sheppard shall be identified in the further iterations, e.g., long black nose, brown eyes, black-brown wolf-like body figure, etc. However, such characteristics may not be sufficient to provide a match to any of the plurality of MMDEs if separated from the 'dogs' concept. Therefore, the routing may enable a structured match to the plurality of MMDEs, i.e., matching the cleaned MMDE in association with the 'dogs' concept.

As another non-limiting example, upon receiving an image of a Sphinx breed cat, the image is analyzed and signatures are generated respective thereof. The image is then matched to the CDB 150 and a match is made to a 'cats' concept. The characteristics associated with cats (i.e., the characteristics represented by portions of the signature representing the 'cats' concept) are determined to be redundant because they already appear in the CDB 150, and are cleaned from the image such that the remaining portion of the image does not show the cat. Any signatures generated for this cleaned image will no longer match the 'cats' concept.

It should be clear that the routing process may limit the scope of possible matches. Therefore, it is optional, and the decision whether or not to execute such routing process may be made based on the match, concepts structure generated therefore, or both.

Based on the match, a plurality of top MMDEs, such as MMDEs from a world database, for which the match is above a predetermined threshold is selected by the MP 130. The MP 130 then matches the top plurality of MMDEs based on their signatures. Based on the match, a concept generator (CG) 140 is configured to create a concept.

The result is a compact representation of a concept that can now be easily compared against a subsequently received MMDE to determine if the subsequently received MMDE matches a concept stored, for example in CDB 150, by the CG 140. This can be done, for example and without limitation, by providing a query to the system 100 for finding a match between a concept and a MMDE.

Then, the cleaned image, i.e., without the 'cats' concept is matched to a world database. Based on the match, a plurality of images and videos in which Sphinx breed cats are shown are identified therein. The identified images and videos are then matched to the received image of a Sphinx and based on the match, a concept of 'Sphinx cats' is generated. The concept is then added to the CDB 150. The portions of the MMDE that are determined to already exist in the CDB 150 are removed from the MMDE by a cleaning unit (CU) 110. A concept exhaustion unit (CEU) 170 then is used to generate any remaining concepts from each MMDE received. The CEU 170 checks whether additional potential concepts can be generated based on the MMDE, after the exclusion of the portions that comprises the previously generated concept. If additional potential concepts can be generated, the customized MMDE, i.e., cleaned of already existing concepts, is sent to the SG 120 and the process is repeated. If no further concepts can be generated from the MMDE, the operation ends after the last concept generated is sent to the CDB 150.

As yet another additional non-limiting example, an image of a dog in the foreground and a building in the background is received. A signature is generated for the image, which includes a signature for the dog and a signature for the building. If a matching 'dog' signature already exists in the CDB 150, the dog is removed from the image, leaving the building remaining. The process is repeated, but now only the signature of the building is left to be compared to potential matching MMDEs without having to process the signature of the dog, thereby requiring less time and processing power to perform the comparison.

Figure 2:
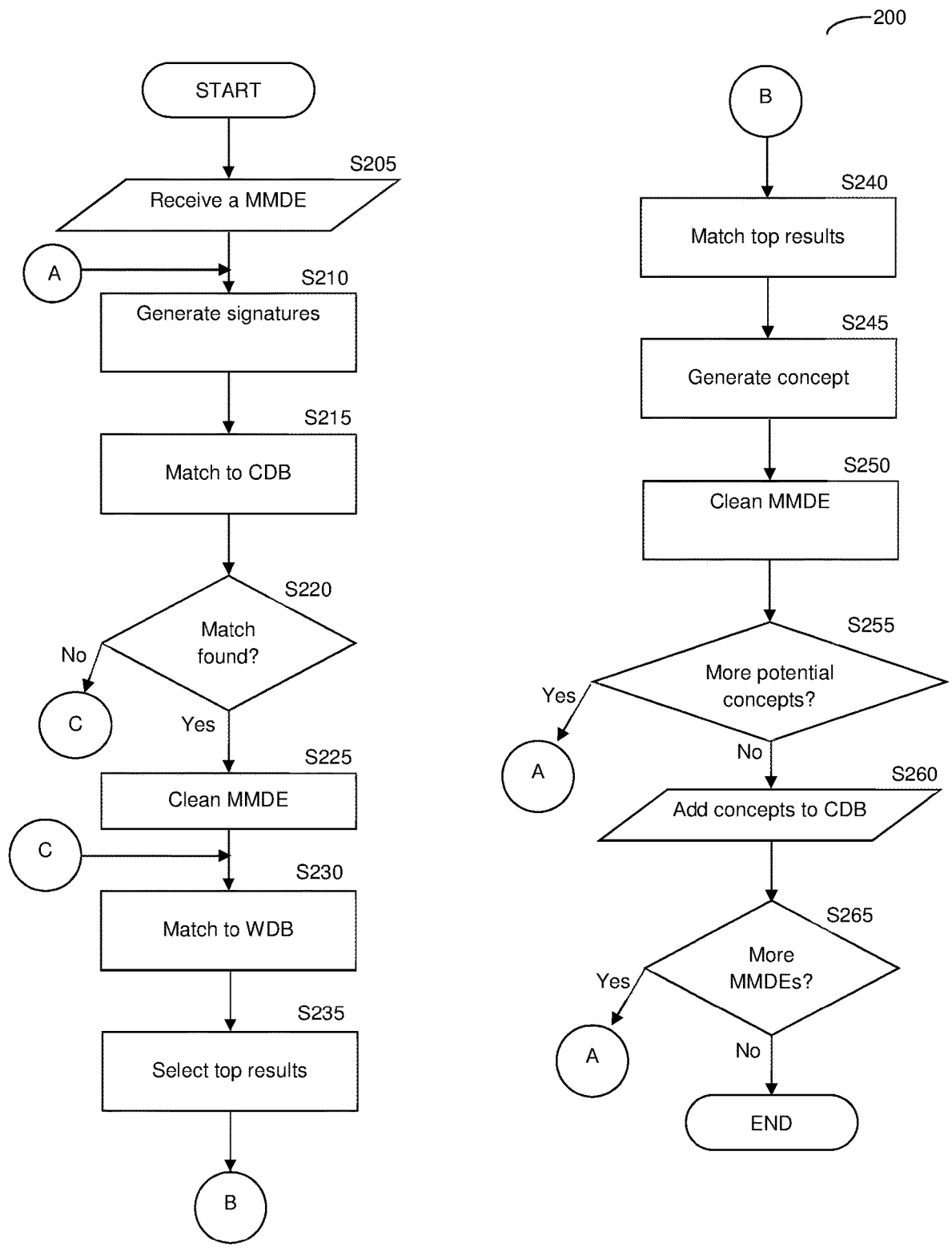
FIG. 2 is a flowchart illustrating a method for enriching a concept database according to an embodiment.

FIG. 2 shows a flowchart illustrating a method 200 for enriching a concept database according to an embodiment. At S205, at least one MMDE is received. The at least one MMDE may include, for example, an image, graphics, a video stream, a video clip, a video frame, a photograph, images of signals, combinations thereof, and portions thereof.

At S210, at least one signature is generated based on the at least one MMDE. The signatures may be generated by, e.g., the SG 120 of FIG. 1. In an embodiment, multiple signatures are generated based on various concepts within the MMDE. The generation of the signatures is further described herein below with respect of FIGS. 3 and 4.

At S215, the at least one MMDE is matched to a concept database (CDB). That match is made based on the generated at least one signature. The CDB contains previously determined concepts.

At S220, it is checked whether there is at least one matching concept in the CDB that matches the at least one MMDE and if so, execution continues with S225; otherwise, execution continues with S230.

At S225, the at least one MMDE is cleaned with respect to the matching concepts stored in the CDB to create a reduced representation of the at least one MMDE. The reduced representation is created by removing redundant elements from the at least one MMDE, from the generated at least one signature, or both, based on the match. The redundant elements removed at S225 are elements for which concepts already exist in the CDB.

At S230, the reduced representation is matched to a world database. The world database may be one or more web sources over the network, one or more locally accessible databases, or a combination thereof. At S235, based on the match, top matched results are selected from the world database(s). The top matched results may be selected based on, for example, a predetermined similarity threshold.

At S240, a matching process is performed among the top matched results and the at least one MMDE based on their respective signatures. At S245, based on the matching among the top matched results and the at least one MMDE, a concept is generated.

At S250, the portions associated with the generated concept are cleaned from the at least one MMDE. The cleaning includes removing redundant portions of the at least one MMDE, from the generated at least one signature, or both, based on the match. The redundant elements removed at S250 are elements matching the generated concept.

At S255, it is checked whether additional potential concepts can be generated based on the cleaned MMDE and if so, execution continues with S210, where a new signature is generated based on the cleaned MMDE; otherwise, execution continues with S260.

In optional S260, the newly generated concept structure is added to the CDB. In S265, it is checked whether additional MMDEs have been received and if so, execution continues with S210; otherwise, execution terminates.

It should be noted that, at least in some embodiments, multiple cleaning processes are performed in order to reduce computing resources needed for subsequent comparisons. In an example implementation, a MMDE is cleaned a first time to create a reduced representation that excludes concepts already existing in the concept database and is subsequently cleaned a second time when a concept has been generated based on top matching results and the MMDE. Thus, only "new" portions of the MMDE are matched to the WDB, thereby resulting in a reduction in the total amount of data process and faster processing. In another example implementation, the second cleaning may be performed iteratively, with each iteration including cleaning with respect to a different newly generated concept. Thus, as new concepts are generated, portions of the MMDE or of the respective signature that represent the new concepts are removed, thereby further reducing the amount of data being compared and, accordingly, reducing processing time and power.

Figure 3:
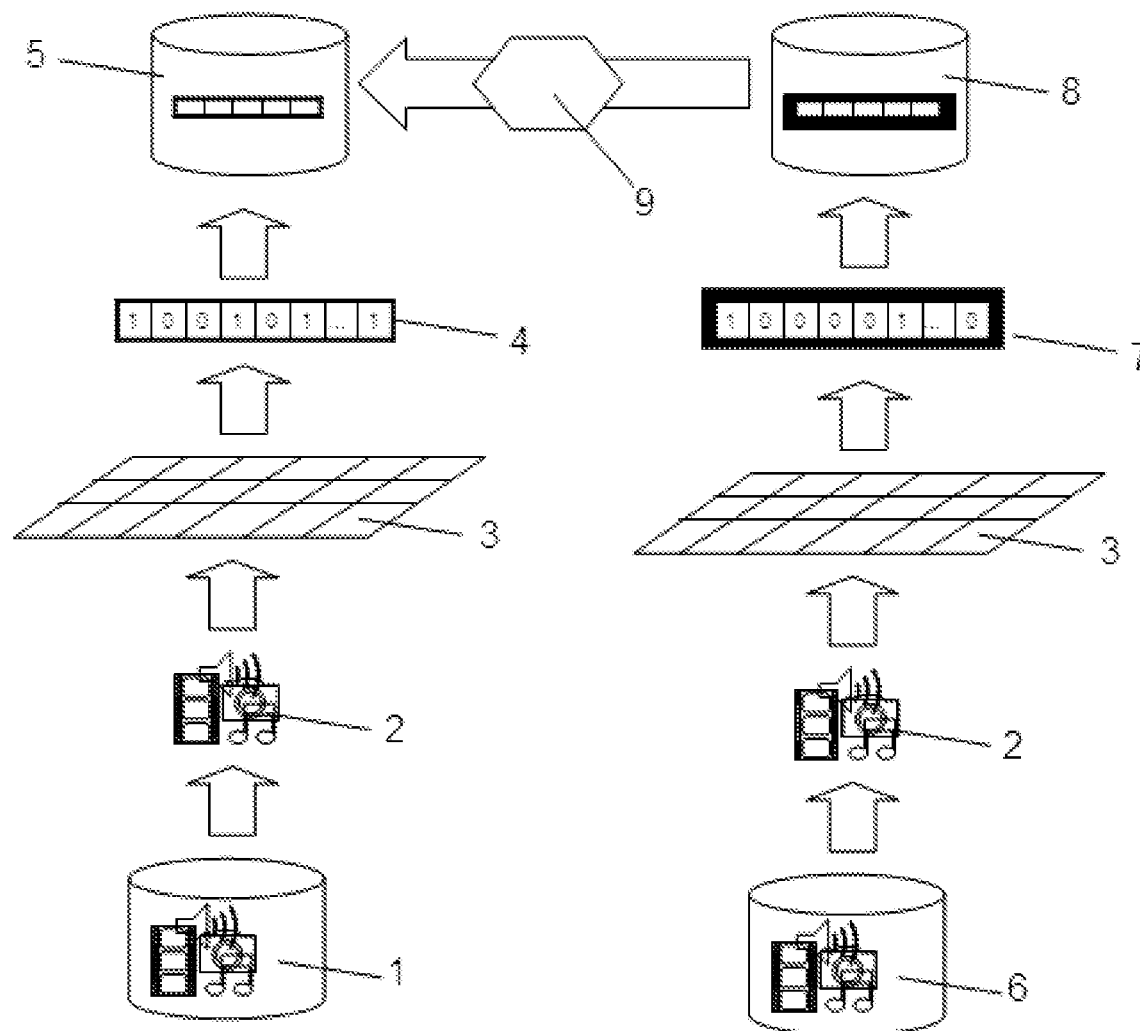
FIG. 3 is a block diagram depicting the basic flow of information in the signature generator system.
Figure 4:
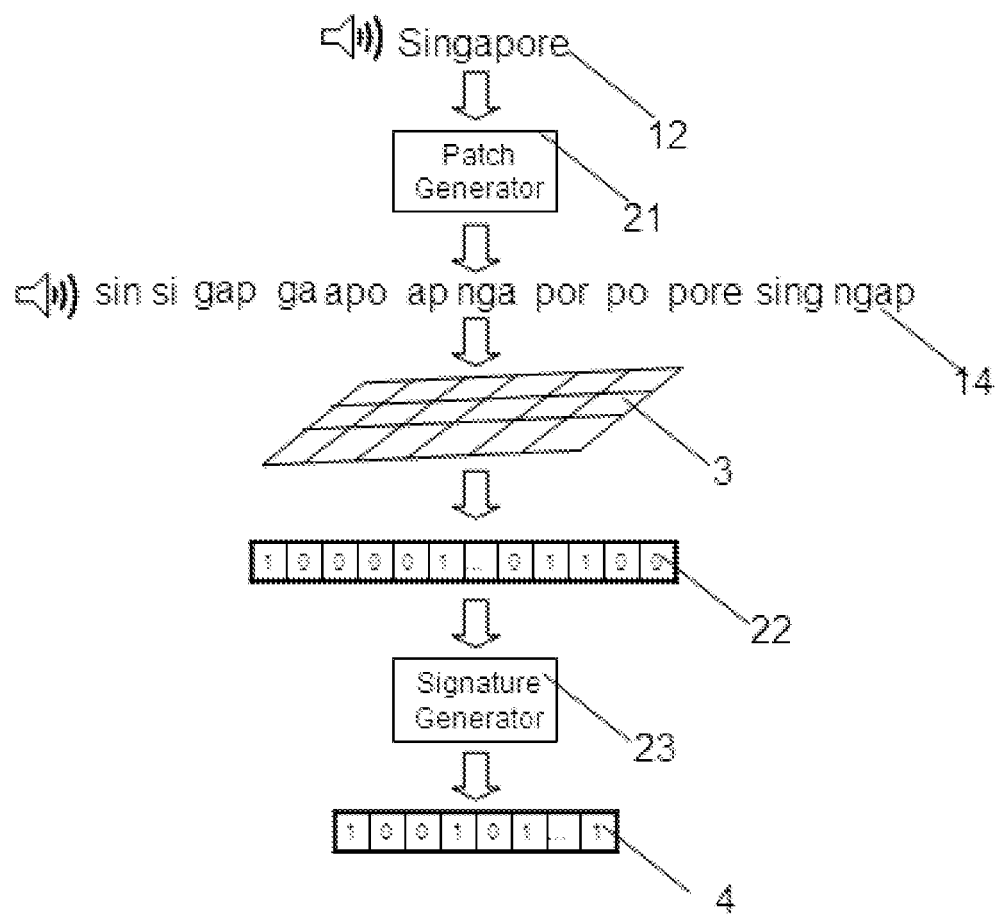
FIG. 4 is a diagram showing the flow of patches generation, response vector generation, and signature generation in a large-scale speech-to-text system.

FIGS. 3 and 4 illustrate the generation of signatures for the multimedia content elements by the SGS 120 according to one embodiment. An exemplary high-level description of the process for large scale matching is depicted in FIG. 3. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below.

The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment, the signature generator 120 is configured with a plurality of computational cores to perform matching between signatures.

The Signatures' generation process is now described with reference to FIG. 4. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame T is injected into all the Cores 3. Then, Cores 3 generate two binary response vectors: which is a Signature vector, and which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \theta(V_i - Th_X)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_X$ is a constant Threshold value, where 'x' is 'S' for Signature and 'RS' for Robust Signature; and Vi is a Coupling Node Value.

The Threshold values $Th_X$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

1: For:
$V_i > Th_{RS}$
$1-p(V>Th_S)-1-(1-\varepsilon)^l \ll 1$ i.e., given that I nodes (cores) constitute a Robust Signature of a certain image I, the probability that not all of these I nodes will belong to the Signature of same, but noisy image, is sufficiently low (according to a system's specified accuracy).

2: $p(V_i > Th_{RS}) \approx l/L$ i.e., approximately I out of the total L nodes can be found to generate a Robust Signature according to the above definition.

3: Both Robust Signature and Signature are generated for a certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in U.S. Pat. No. 8,655,801, referenced above, the contents of which are hereby incorporated by reference.

Figure 5:
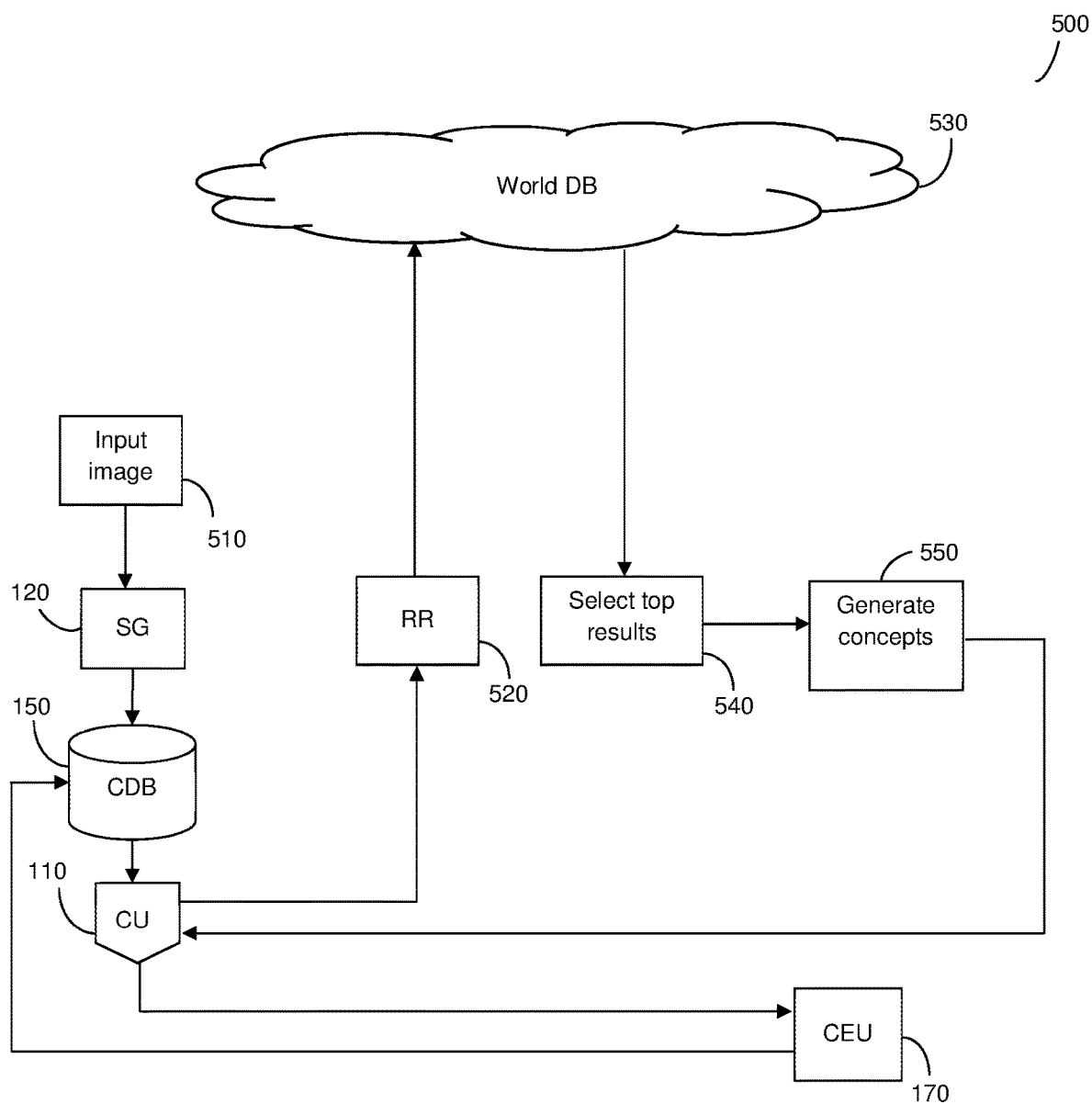
FIG. 5 is a flow diagram illustrating a concept database enrichment according to an embodiment.

FIG. 5 is a flow diagram 500 illustrating a concept database enrichment according to an embodiment. At least one input MMDE is received. In the example flow diagram 500, the input MMDE is an input image 510. At least one signature is generated based on the input image 510. The signature may be generated by the SG 120. The input image 510 is then matched to the CDB 150 based on the at least one signature generated. Based on the match, the CU 110 cleans redundant elements from the input image 510 by removing elements from the input image 510 that have matching concepts within the CDB 150.

A reduced representation (RR) 520 of the input image 510 is generated based on the cleaning process. The reduced representation is then matched to a world database (DB) 530 for identifying matching MMDEs therein. Based on the match to the world DB 530, top matching results 540 are selected. The selection of top matching results is further described hereinabove with respect to FIG. 1. The top matching results are matched with the input image, and a concept is generated 550 based on the match. The cleaning unit (CU) 110 cleans from the portions of the input image 510, the signatures associated with the generated concept 550. It is then checked, via a concept exhaustion unit (CEU) 170, whether additional potential concepts can be generated based on the clean MMDE. The concept is then sent to the CDB 150.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for enriching a concept database, comprising:
   determining, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE;
   generating a reduced representation of the first MMDE, wherein generating the reduced representation further comprises removing the portion of the first MMDE matching the at least one first concept;
   comparing the reduced representation of the first MMDE to signatures representing a plurality of second MMDEs to determine a plurality of matching second MMDEs; generating, based on the reduced representation of the first MMDE and the plurality of matching second MMDEs, at least one second concept; and
   adding the generated at least one second concept to the concept database.

2. The method of claim 1, further comprising: cleaning the first MMDE, wherein the cleaning further comprises removing at least a portion of the first MMDE matching each generated second concept.

3. The method of claim 2, wherein the first MMDE is cleaned recursively after generation of each of the at least one second concept.

4. The method of claim 1, wherein each second concept includes at least a portion of the reduced representation and at least a portion of the signatures representing the plurality of second MMDEs.

5. The method of claim 1, wherein each MMDE is at least one of: an image, a graphic, a video stream, a video clip, a video frame, a photograph, and an image of signals.

6. The method of claim 1, wherein each concept is a collection of signatures and metadata representing the concept.

7. The method of claim 1, wherein each signature is generated by a signature generator system, wherein the signature generator system includes a plurality of at least statistically independent computational cores, wherein the properties of each core are set independently of the properties of each other core.

8. A non-transitory computer readable medium having stored thereon instructions for causing a processing circuitry to perform a process, the process comprising:
   determining, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE;
   generating a reduced representation of the first MMDE, wherein generating the reduced representation further comprises removing the portion of the first MMDE matching the at least one first concept;
   comparing the reduced representation of the first MMDE to signatures representing a plurality of second MMDEs to determine a plurality of matching second MMDEs;
   generating, based on the reduced representation of the first MMDE and the plurality of matching second MMDEs, at least one second concept; and
   adding the generated at least one second concept to the concept database.

9. The non-transitory computer readable medium of claim 8, further storing instructions for: cleaning the first MMDE, wherein the cleaning further comprises removing at least a portion of the first MMDE matching each generated second concept.

10. The non-transitory computer readable medium of claim 9, further storing instructions for cleaning the first MMDE recursively after generation of each of the at least one second concept.

11. The non-transitory computer readable medium of claim 8, wherein each second concept includes at least a portion of the reduced representation and at least a portion of the signatures representing the plurality of second MMDEs.

12. The non-transitory computer readable medium of claim 8, wherein each concept is a collection of signatures and metadata representing the concept.

13. The non-transitory computer readable medium of claim 8, wherein each signature is generated by a signature generator system, wherein the signature generator system includes a plurality of at least statistically independent computational cores, wherein the properties of each core are set independently of the properties of each other core.

14. A system for enriching a concept database, comprising:
   a processing circuitry; and
   a memory, the memory containing instructions that, when executed by the processing circuitry, configure the system to:
   determine, based on at least one signature of a first multimedia data element (MMDE) and signatures of a plurality of existing concepts in the concept database, at least one first concept among the plurality of existing concepts, wherein each of the at least one first concept matches a portion of the at least one signature of the first MMDE;
   generate a reduced representation of the first MMDE, wherein generating the reduced representation further comprises removing the portion of the first MMDE matching the at least one first concept;
   compare the reduced representation of the first MMDE to signatures representing a plurality of second MMDEs to determine a plurality of matching second MMDEs;
   generate, based on the reduced representation of the first MMDE and the plurality of matching second MMDEs, at least one second concept; and
   add the generated at least one second concept to the concept database.

15. The system of claim 14, wherein the system is further configured to:
   clean the first MMDE, wherein the cleaning further comprises removing at least a portion of the first MMDE matching each generated second concept.

16. The system of claim 15, wherein the first MMDE is cleaned recursively after generation of each of the at least one second concept.

17. The system of claim 14, wherein each second concept includes at least a portion of the reduced representation and at least a portion of the signatures representing the plurality of second MMDEs.

18. The system of claim 14, wherein each MMDE is at least one of: an image, a graphic, a video stream, a video clip, a video frame, a photograph, and an image of signals.

19. The system of claim 14, wherein each concept is a collection of signatures and metadata representing the concept.

20. The system of claim 14, wherein each signature is generated by a signature generator system, wherein the signature generator system includes a plurality of at least statistically independent computational cores, wherein the properties of each core are set independently of the properties of each other core.

* * * * *